Feb. 17, 1925.

A. W. LE BLANC

SPRING BALANCE SCALE

Filed July 6, 1922

1,527,048

Inventor
Arthur W. LeBlanc,

By

Attorney

Patented Feb. 17, 1925.

1,527,048

UNITED STATES PATENT OFFICE.

ARTHUR W. LE BLANC, OF BRIMLEY, MICHIGAN.

SPRING-BALANCE SCALE.

Application filed July 6, 1922. Serial No. 573,114.

*To all whom it may concern:*

Be it known that ARTHUR W. LE BLANC, a citizen of the United States of America, residing at Brimley, in the county of Chippewa and State of Michigan, has invented new and useful Improvements in Spring-Balance Scales, of which the following is a specification.

The object of the invention is to provide a scale of the spring balance type having means for indicating the total weight at the end of a plurality or succession of weighing operations to avoid the necessity of making notes or keeping a mental record of a succession of transactions and in order to provide for determining an aggregate amount by weight which is in excess of the capacity of the scale in a single operation; and with this object in view the invention consists in a construction and combination of parts of which a preferred embodiment is shown in the accompanying drawings, wherein:—

Figure 1:
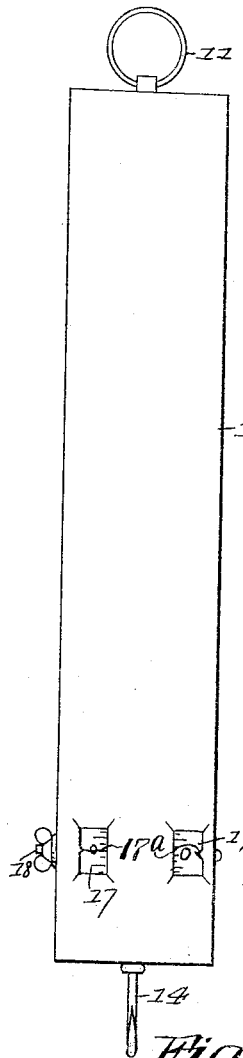
Figure 1 is an elevation of a scale embodying the invention.
Figure 2:
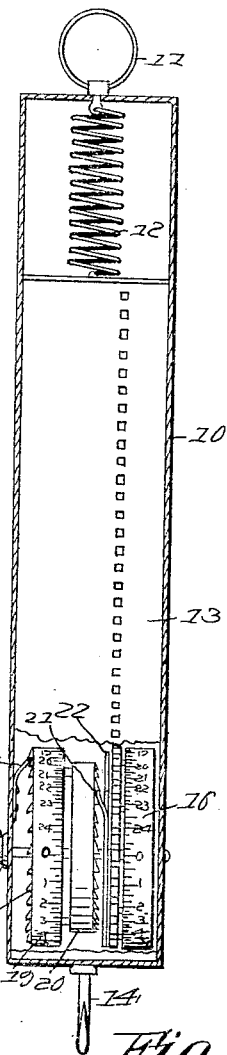
Figure 2 is a similar view with the front plate omitted.
Figure 3:
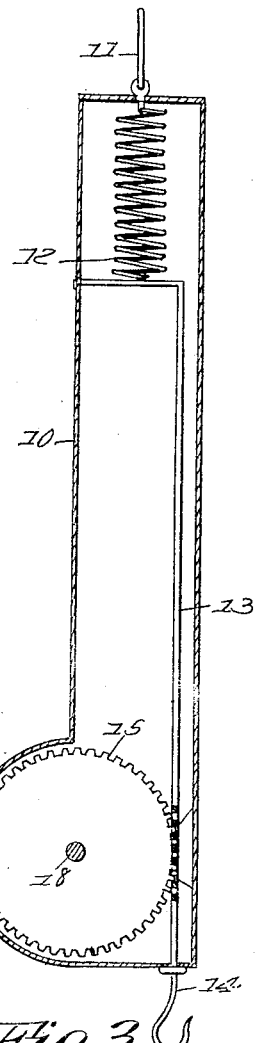
Figure 3 is a vertical section at right angles to the plane of Figure 2.
Figure 4:
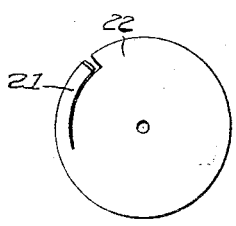

Within a suitable casing or housing 10 which as in the ordinary practice may be provided at its upper end with a supporting or finger ring 11 is arranged a balance spring 12 connected by means of a strap 13 with a hook 14 from which the sack or receptacle containing the load to be weighted may be suspended. In the construction illustrated this strap 13 consists of a perforated strap arranged in operative relation with a spur wheel 15 and having perforations to receive the spurs of said wheels so that in the downward movement of the supporting hook 14 causing the extension of the balance spring 12 motion is communicated from the strap to the spur gear which carries a drum 16 having a graduated periphery indicating pounds and fractions or divisions thereof such as ounces visible through inspection openings 17 in the front wall of the casing or housing and cooperating with indexes 17ª at the side edges of said inspection openings.

Also mounted in the casing on a suitable spindle 18 is a second registering drum 19 which carries a ratchet disk 20 for actuation by a pawl 21 forming a part of a disk 22 which is carried by the spur gear 15. A similar disk 23 having a pawl 24 is fixed against the wall of the casing in position to engage ratchet teeth on the drum 19.

In the operation of the device the weight represented by each transaction obviously is indicated by the exposed character of the drum 16 which for convenience may be referred to as the primary or weighing drum, and as each weighed load is removed therefrom this weighing drum returns to its normal or zero position under the action of the weighing strap 13 cooperating with the spur gear 15. The forward movement of the weighing drum, however, is communicated to the drum 19 which for convenience may be referred to as the totalling drum which is prevented from returning to its initial or zero position by reason of the check pawl 24. Each subsequent operation of the mechanism causing a forward movement of the weighing drum therefore produces an additional forward movement of the totalling drum which is added to the amount already registered thereby, so that after a plurality of operations of the weighing drum the totalling drum will indicate the total or aggregate amount represented by the several operations of the weighing drum, and the operator is thereby relieved of the necessity of keeping account of the successive weights determined by the weighing drum and of adding them in order to obtain the total amount weighed in the several transactions, and by increasing the capacity of the totalling drum it is obvious that the range of operation of the mechanism may be increased to suit the particular purpose for which the scale is designed and without objectionably multiplying the parts of the mechanism. By turning the thumb screw mounted on the spindle 18 exterior to the housing, the totalling drum 19 can be turned to its initial or zero position.

Having described the invention, what is claimed as new and useful is:—

A spring balance scale comprising a casing, a strap mounted for movement in the casing and having an end portion disposed below the lower end of the casing, a spring connecting the upper portion of the strap with the casing, said strap being provided with a series of apertures, a shaft passing transversely through the casing, a drum journaled upon the shaft, a gear wheel connected with the drum and adapted to engage in the apertures of the strap, a pawl device carried by the gear wheel, a ratchet device mounted upon the shaft and engageable by the pawl, a second drum fixed to the shaft and connected with said ratchet device and being provided at its side with ratchet teeth, and a pawl mounted upon the casing and engageable with the last mentioned ratchet teeth, the drums on their peripheries, being provided with weight indicating graduations, and the casing having openings through which said graduations are visible and indexes with which said graduations co-operate.

In testimony whereof he affixes his signature.

ARTHUR W. LE BLANC